United States Patent
Li et al.

(10) Patent No.: US 8,107,481 B2
(45) Date of Patent: Jan. 31, 2012

(54) METHODS AND APPARATUS FOR IDENTIFYING AND/OR SELECTING A CONNECTION IDENTIFIER

(75) Inventors: Junyi Li, Bedminster, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 12/246,905

(22) Filed: Oct. 7, 2008

(65) Prior Publication Data
US 2010/0085973 A1 Apr. 8, 2010

(51) Int. Cl.
H04L 12/28 (2006.01)
(52) U.S. Cl. .................. 370/395.3; 370/328; 370/310.2
(58) Field of Classification Search .................. None
See application file for complete search history.

(56) References Cited

U.S. PATENT DOCUMENTS

| | | | |
|---|---|---|---|
| 5,287,544 A | 2/1994 | Menich et al. | |
| 6,868,277 B1 * | 3/2005 | Cerwall et al. | 455/509 |
| 2007/0010270 A1 | 1/2007 | Dillon | |
| 2009/0003267 A1 * | 1/2009 | Ramachandran et al. | 370/328 |

OTHER PUBLICATIONS

International Search Report and Written Opinion—PCT/US09/058593, International Searching Authority—European Patent Office, Jan. 28, 2010.

* cited by examiner

Primary Examiner — Robert Wilson
(74) Attorney, Agent, or Firm — Peng Zhu; James K. O'Hare (57) ABSTRACT

Wireless terminals in a peer to peer system, which desire to communicate traffic signals, acquire a connection identifier associated with traffic transmission request air link resources. The air link resources in the system, in some embodiments, are structured so that each connection identifier has a one to one mapping to a request transmission unit, the request transmission units are arranged into a plurality of groups, and each group occurs in a different symbol time interval for the same traffic slot. A wireless terminal identifies locally available connection identifiers from a set of connection identifiers based on power received on individual connection identification transmission units in a set of connection identification transmission units; determines, for each group having an identified locally available connection identifier, an interference estimate; and selects a connection identifier from the identified locally available connection identifiers belonging to a group having an acceptable determined interference estimate.

28 Claims, 9 Drawing Sheets

METHODS AND APPARATUS FOR IDENTIFYING AND/OR SELECTING A CONNECTION IDENTIFIER

FIELD

Various embodiments relate to wireless communications, and more particularly, to methods and apparatus related to peer to peer communications.

BACKGROUND

In a wireless communications system lacking centralized control, the scheduling of traffic segments can be a challenging task. At a given time, at different locations in the system, different wireless terminals may have different perspectives as to locally available connection identifiers, locally available air link resources and/or interference considerations. Using an approach where a wireless terminal seeking to acquire a connection identifier, simply randomly selects a connection identifier tends to lead to collisions resulting in inefficient use of air link resources. It would be desirable if a wireless terminal seeking to acquire a connection identifier could be made situationally aware of connection identifiers being currently used in its local vicinity.

Based on the above discussion, there is a need for methods and apparatus that support the identification and selection of connection identifiers such as to provide for coordinated interference management.

SUMMARY

Methods and apparatus relating to scheduling of air link resources, e.g., traffic segments, in a wireless communications system are described. Various described methods and apparatus are well suited to wireless peer to peer networks in which traffic scheduling is decentralized, e.g. an ad hoc peer to peer network. In some embodiments wireless terminals, which desire to communicate peer to peer traffic signals, acquire a connection identifier associated with traffic transmission request air link resources. Various methods and apparatus are directed to the acquisition and/or selection of a connection identifier by a wireless terminal.

In some embodiments, a wireless terminal seeking to acquire a connection identifier identifies locally available connection identifiers, determines interference estimates associated with at least some of the identified locally available connection identifiers; and selects a connection identifier from the identified locally available connection identifiers.

In some embodiments, the air link resources are structured so that each connection identifier has a one to one mapping to a request transmission unit, the request transmission units are arranged into a plurality of groups, and each group occurs in a different symbol time interval for the same traffic slot. In such an embodiment, it may be useful to determine interference estimates on a per group basis.

An exemplary method of operating a first communications device, in some embodiments includes identifying locally available connection identifiers from a set of connection identifiers based on power received on individual connection identification transmission units in a set of connection identification transmission units; and determining, for each group having an identified locally available connection identifier, an interference estimate. The exemplary method further includes selecting a connection identifier from the identified locally available connection identifiers belonging to a group having an acceptable determined interference estimate.

An exemplary first communications device, in accordance with some embodiments, includes: at least one processor configured to: identify locally available connection identifiers from a set of connection identifiers based on power received on individual connection identification transmission units in a set of connection identification transmission units; determine, for each group having an identified locally available connection identifier, an interference estimate; and select a connection identifier from the identified locally available connection identifiers belonging to a group having an acceptable determined interference estimate. The exemplary first communications device further includes a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
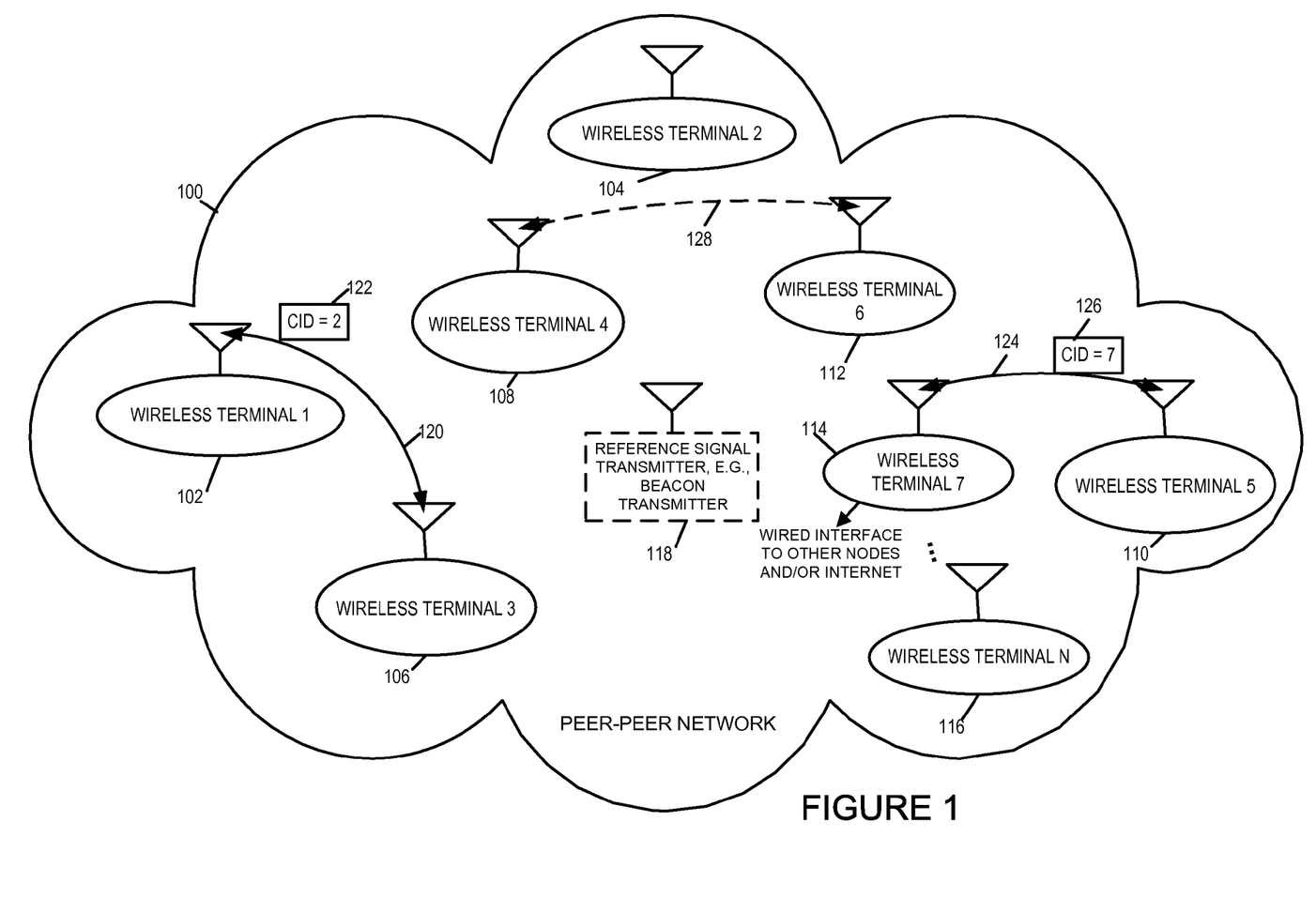
FIG. 1 is a drawing of an exemplary peer to peer network, e.g., an ad-hoc communications network, in accordance with an exemplary embodiment.

FIG. 1 is a drawing of an exemplary peer to peer network 100, e.g., an ad-hoc communications network, in accordance with an exemplary embodiment. The exemplary network supports peer to peer traffic signaling by communication devices, e.g., mobile wireless terminals. The exemplary network 100 supports decentralized scheduling of traffic air link resources, e.g., segments, on a slot by slot basis. Exemplary peer to peer network 100 includes a plurality of wireless devices (wireless terminal 1 102, wireless terminal 2 104, wireless terminal 3 106, wireless terminal 4 108, wireless terminal 5 110, wireless terminal 6 112, wireless terminal 7 114, . . . , wireless terminal N 116) supporting peer to peer traffic signaling. In some embodiments, the network 100 includes a reference signal transmitter 118, e.g., a beacon transmitter. The wireless devices (102, 104, 106, 108, 110, 112, 114, . . . , 116) in the communications network 100 can establish connections with one another, e.g., peer to peer connections, broadcast acquired connection identifier information, identify locally available connection identifiers, determine interference information, select a connection identifier, generate and transmit traffic transmission request signals, receive and process traffic transmission request signals, make receiver yielding decisions, generate and transmit traffic transmission request response signals, receive and process traffic transmission request response signals, make transmitter yielding decisions, receive peer to peer traffic signals, and transmit peer to peer traffic signals. Some of the wireless terminals, e.g., wireless terminal 7 114 also include a wired interface for coupling the wireless terminal to other nodes and/or the Internet, via a backhaul network.

There is a recurring timing structure used in the network 100. In various embodiments, a connection identifier has a one to one mapping to a request transmission unit, request transmission units are arranged into a plurality of groups, and each group occurs in a different symbol transmission time interval for a given traffic slot. Such a structure facilitates group based interference evaluations and comparisons.

In some embodiments a reference signal, e.g., an OFDM beacon signal from reference signal transmitter 118, is used by a wireless device to synchronize with respect to the timing structure. Alternatively, a signal used to synchronize with the timing structure may be sourced from another device, e.g., a GPS transmitter, a base station or another peer to peer device. The timing structure used in the network includes a plurality of individual traffic slots.

In FIG. 1, wireless terminal 1 102 has a current peer to peer connection 120 with wireless terminal 3 106, and connection identifier 2 is associated with connection 120 as indicated by box 122. Wireless terminal 7 114 has a current peer to peer connection 124 with wireless terminal 5 110, and the connection identifier 7 is associated with connection 124. Wireless terminal 4 108 seeks to acquire a connection identifier for the connection 128 that it is seeking to establish with wireless terminal 6 112. At different times, different connections may exist in the network 100, and different wireless terminals may be seeking to establish a new connection and acquire a new connection identifier.

Figure 2:
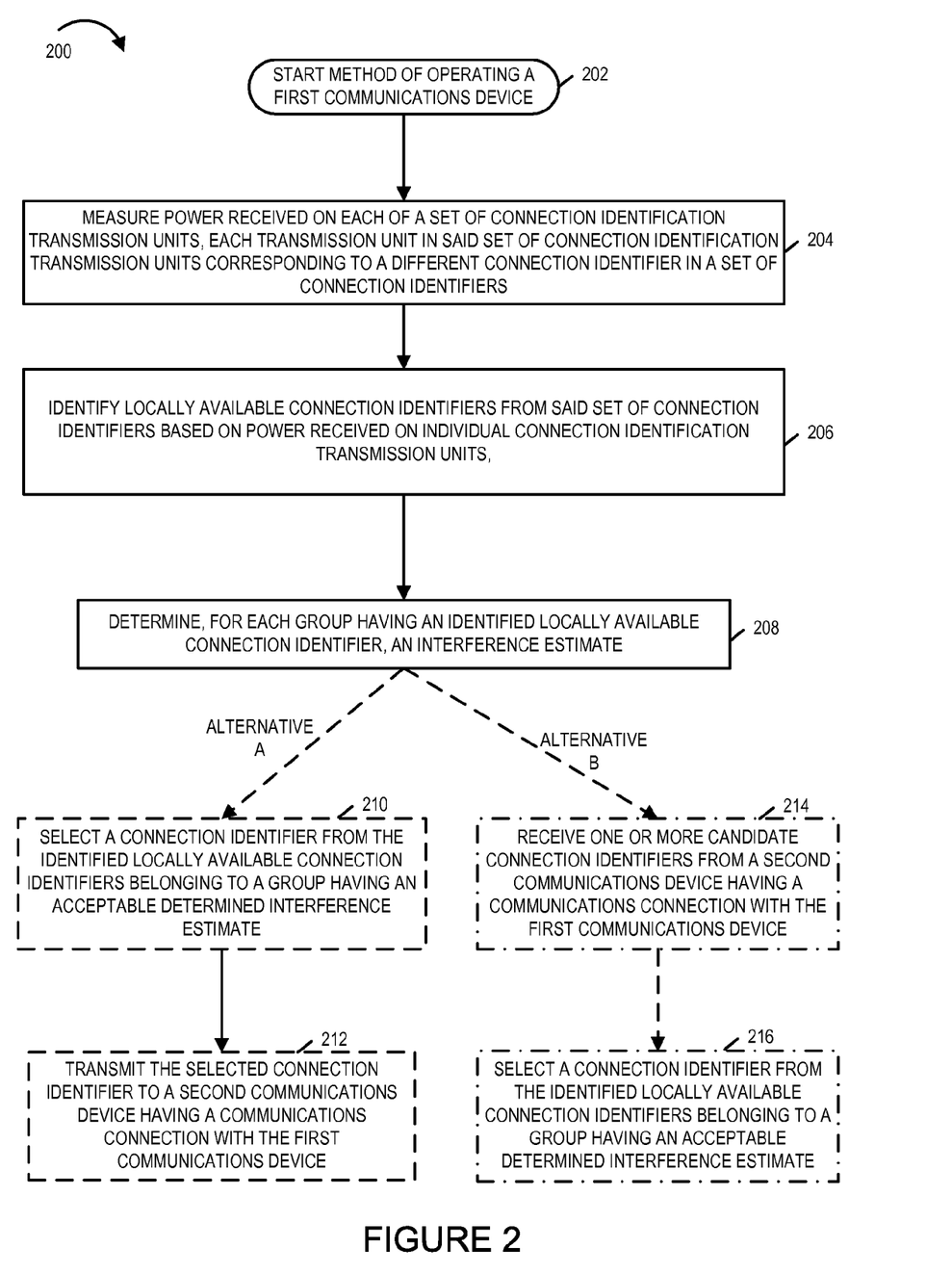
FIG. 2 is a flowchart of an exemplary method of operating a first communications device in accordance with an exemplary embodiment.

FIG. 2 is a flowchart 200 of an exemplary method of operating a first communications device in accordance with an exemplary embodiment. Operation of the exemplary method starts in step 202, where the first communications device is powered on and initialized and proceeds to step 204.

In step 204, the first communications device measures power received on each of a set of connection identification transmission units, each transmission unit in said set of connection identification transmission units corresponding to a different connection identifier in a set of connection identifiers. Operation proceeds from step 204 to step 206.

In step 206, the first communications device identifies locally available connection identifiers from said set of connection identifiers based on power received on individual connection identification transmission units. In some embodiments, each of said locally available connection identifiers has a one to one mapping to a request transmission unit. In some such embodiments request transmission units are arranged in a plurality of groups, and each group occurs in a different symbol transmission time interval. Operation proceeds from step 206 to step 208.

In step 208 the first communications device determines, for each group having an identified locally available connection identifier, an interference estimate. Operation proceeds from step 208 to step 210 or step 214, depending upon the implemented or selected alternative.

In step 210 the first communications device selects a connection identifier from the identified locally available connection identifiers belonging to a group have an acceptable determined interference estimate. In some embodiments, a determined interference estimate is acceptable if it is below an interference threshold level. In some embodiments, a determined interference estimate is acceptable if it is the lowest determined interference estimate. In some embodiments, the selected connection identifier of step 210 is a candidate connection identifier. Operation proceeds from step 210 to step 212, in which the first communications device transmits the selected connection identifier to a second communications device having a communications connection with the first communications device. In some embodiments, the selected connection identifier of step 210 is transmitted as part of a set of selected candidate connection identifiers that are transmitted to the second communications device.

Returning to step 214, in step 214 the first communications device receives one or more candidate connection identifiers from a second communications device having a communications connection with the first communications device. Then, in step 216 the first communications device selects a connection identifier from the identified locally available connection identifiers belonging to a group having an acceptable determined interference estimate. In some embodiments, a determined interference estimate is acceptable if it is below an interference threshold level. In some embodiments, a determined interference estimate is acceptable if it is the lowest determined interference estimate. In various embodiments, the selecting of a connection identifier of step 216 includes selecting a connection identifier which is one of the received one or more candidate connection identifiers.

Figure 3:
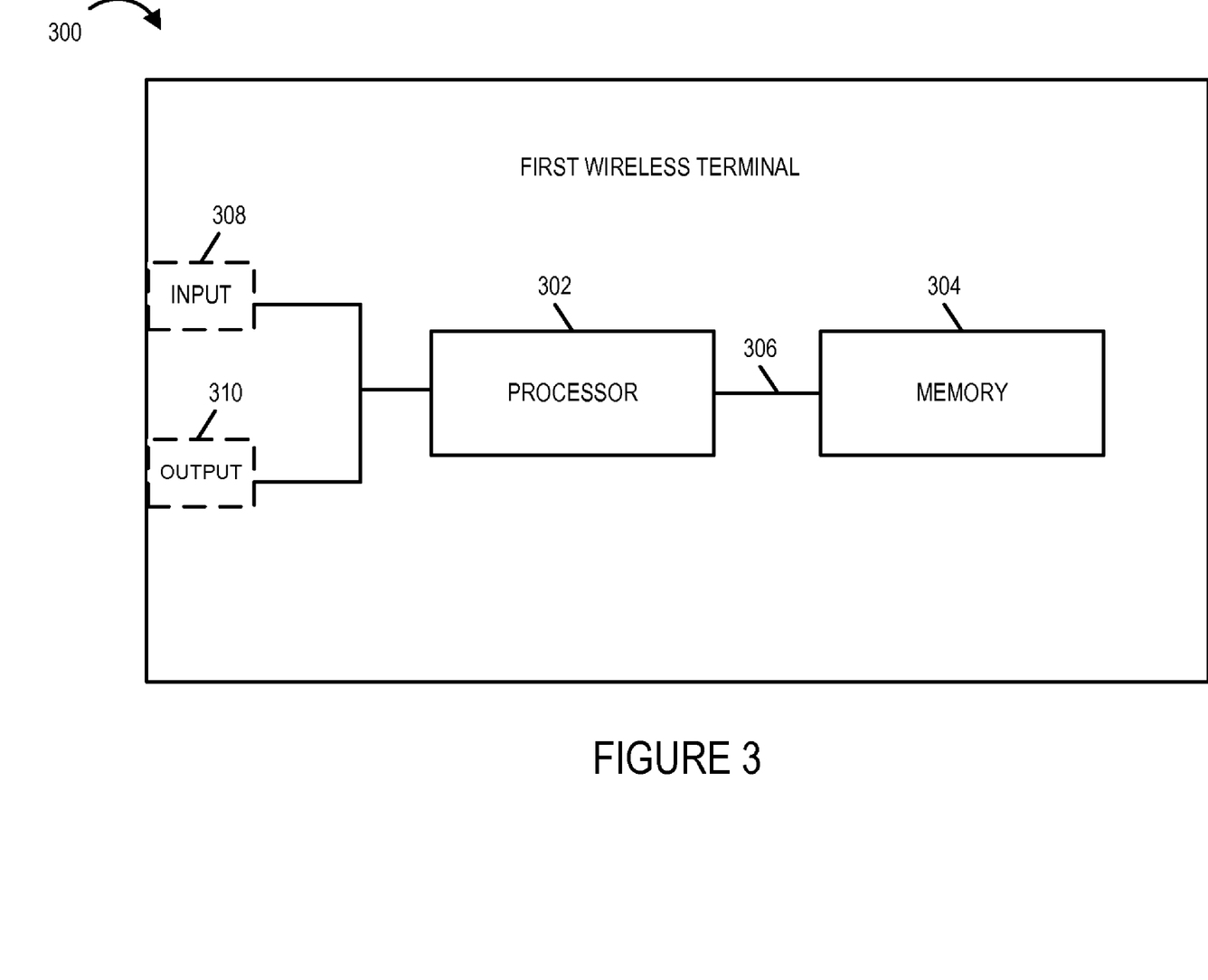
FIG. 3 is a drawing of an exemplary first communications device in accordance with an exemplary embodiment.

FIG. 3 is a drawing of an exemplary first communications device 300 in accordance with an exemplary embodiment. Exemplary first communications device 300 is, e.g., a wireless communications device supporting peer to peer communications and implementing a method in accordance with flowchart 200 of FIG. 2.

First communications device 300 includes a processor 302 and memory 304 coupled together via a bus 306 over which the various elements (302, 304) may interchange data and information. First communication device 300 further includes an input module 308 and an output module 310 which may be coupled to processor 302 as shown. However, in some embodiments, the input module 308 and output module 310 are located internal to the processor 302. Input module 308 can receive input signals. Input module 308 can, and in some embodiments does, include a wireless receiver and/or a wired or optical input interface for receiving input. Output module 310 may include, and in some embodiments does include, a wireless transmitter and/or a wired or optical output interface for transmitting output. Processor 302 is configured to: identify locally available connection identifiers from a set of connection identifiers based on power received on individual connection identification transmission units in a set of connection identification transmission units; determine, for each group having an identified locally available connection identifier, an interference estimate; and select a connection identifier from the identified locally available connection identifiers belonging to a group having an acceptable determined interference estimate.

In some embodiments, each of said locally available connection identifiers has a one to one mapping to a request transmission unit. In some such embodiments, request transmission units are arranged into a plurality of groups, and each group occurs in a different symbol transmission time interval.

In some embodiments, a determined interference estimate is acceptable if it is below an interference threshold level. In some embodiments, a determined interference estimate is acceptable if it the lowest determined interference estimate. In various embodiments, the processor is further configured to measure power received on each of said set of connection identification transmission units prior to identifying locally available connection identifiers, each transmission unit in said set of connection identification transmission units corresponding to a different connection identifier in said set of connection identifiers.

In some embodiments, said selected connection identifier is a candidate connection identifier; and the processor 302 is further configured to: transmit the selected connection identifier to a second communications device having a communications connection with said first communications device. In some such embodiments the processor is configured to transmit the selected connection identifier as part of a set of selected candidate connection identifiers.

The processor 302, in some embodiments, is further configured to: receive one or more candidate connection identifiers from a second communications device having a communications connection with said first communications device; and select a connection identifier which is one of the received one or more candidate connection identifiers when selecting a connection identifier from the identified locally available connection identifiers.

Figure 4:
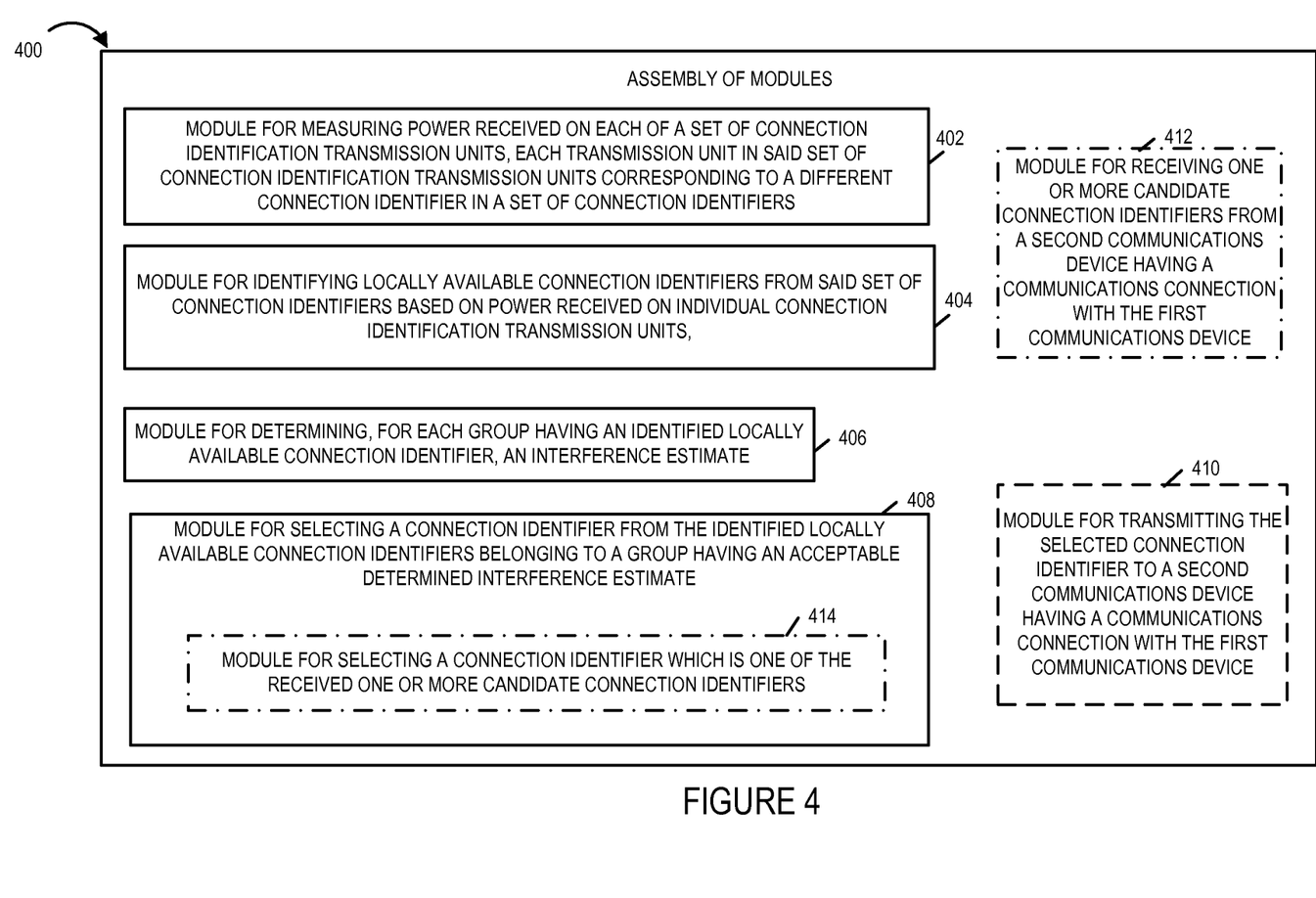
FIG. 4 is an assembly of modules which can, and in some embodiments are, used in the first communications device illustrated in FIG. 3.

FIG. 4 is an assembly of modules 400 which can, and in some embodiments are, used in the first communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the first communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the first communications device 300 or elements therein such as the processor 302, to perform the functions of the corresponding steps illustrated in the method flowchart 200 of FIG. 2.

As illustrated in FIG. 4, the assembly of modules 400 includes: a module 402 for measuring power received on each of a set of connection identification transmission units, each transmission unit in said set of connection identification transmission units corresponding to a different connection identifier in a set of connection identifiers; a module 404 for identifying locally available connection identifiers from said set of connection identifiers based on power received on individual connection identification transmission units in a set of connection identification transmission units, a module 406 for determining, for each group having an identified locally available connection identifier, an interference estimate; and a module 408 for selecting a connection identifier from the identified locally available connection identifiers belonging to a group having an acceptable determined interference estimate.

In some embodiments each of said locally available connection identifiers has a one to one mapping to a request transmission unit. In some embodiments, request transmission units being arranged into a plurality of groups. In some such embodiments each group occurs in a different symbol transmission time interval, e.g., corresponding to the same traffic slot.

In various embodiments, assembly of modules 402 includes one or more of the following: module 410 for transmitting the selected connection identifier to a second communications device having a communications connection with said first communications device; and module 412 for receiving one or more candidate connection identifiers from a second communications device having a communications connection with said first communications device. In various embodiments, module 408 includes module 414 for selecting a connection identifier which is one of the received one or more candidate connection identifiers.

A determined interference estimate, in some embodiments, is acceptable if it is below an interference threshold level. A determined interference estimate, is some embodiments, is acceptable if it the lowest determined interference estimate.

In some embodiments a selected connection identifier from module 408 is a candidate connection identifier. In some such embodiments, the selected connection identifier from module 408 is transmitted by module 408 as part of a set of selected candidate connection identifiers.

Figure 5:
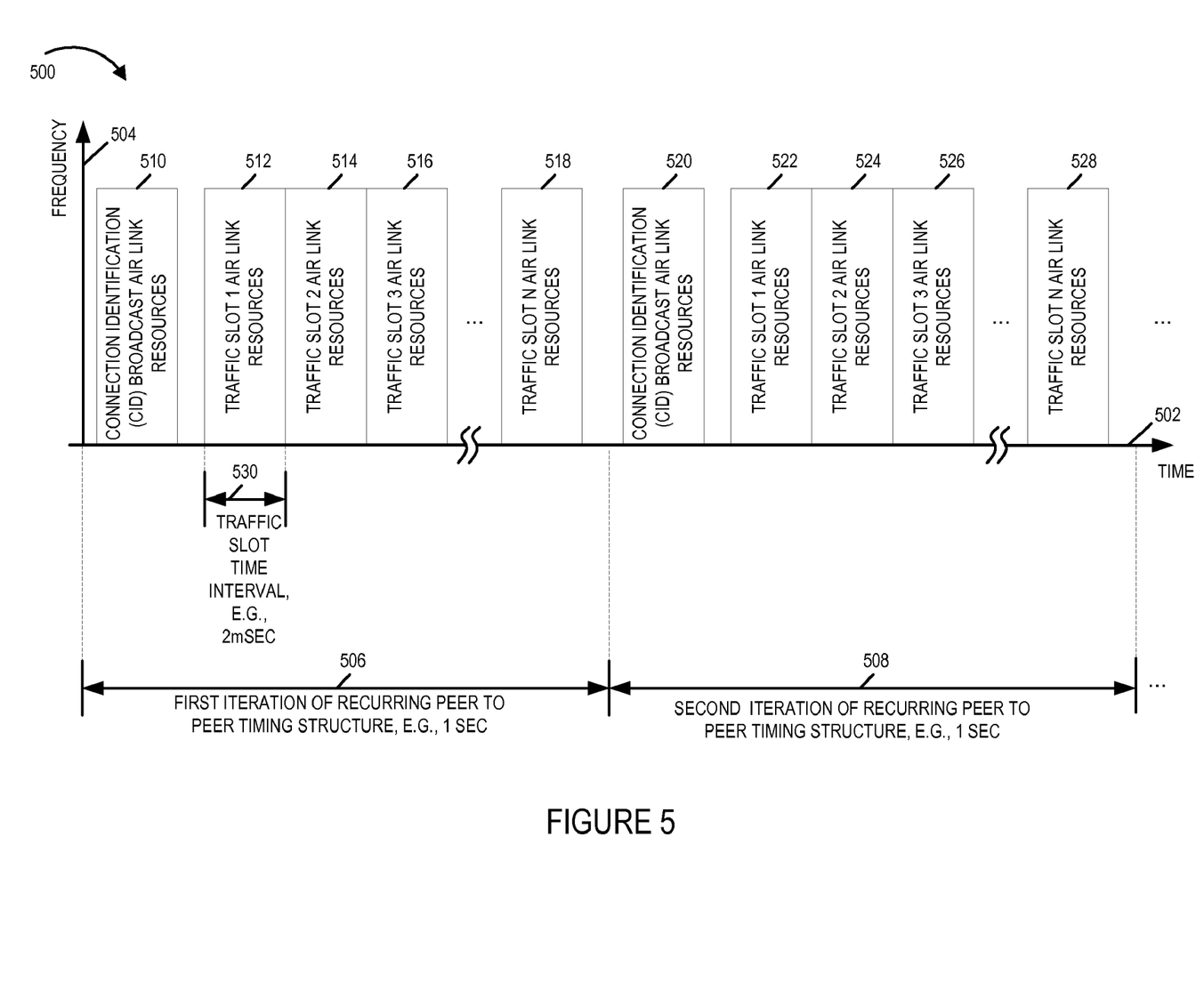
FIG. 5 is a drawing illustrating an exemplary recurring peer to peer timing/frequency structure in accordance with an exemplary embodiment.

FIG. 5 is a drawing 500 illustrating an exemplary recurring peer to peer timing/frequency structure in accordance with an exemplary embodiment. Horizontal axis 502 represents time while vertical axis 504 represents frequency. Two iterations of the recurring peer to peer timing/frequency structure are shown. During the time interval corresponding to first iteration 506 there are connection identification (CID) broadcast air link resources 510 and a plurality of traffic slot air link resources (traffic slot 1 air link resources 512, traffic slot 2 air link resources 514, traffic slot 3 air link resources 516, ..., traffic slot N air link resources 518). Similarly, during the time interval corresponding to second iteration 508 there are connection identification (CID) broadcast air link resources 520 and a plurality of traffic slot air link resources (traffic slot 1 air link resources 522, traffic slot 2 air link resources 524, traffic slot 3 air link resources 526, ..., traffic slot N air link resources 528). A traffic time slot interval, e.g., interval 530 is, e.g., 2 msec in duration, while an iteration of the recurring timing structure is, e.g., 1 sec in duration.

Figure 6:
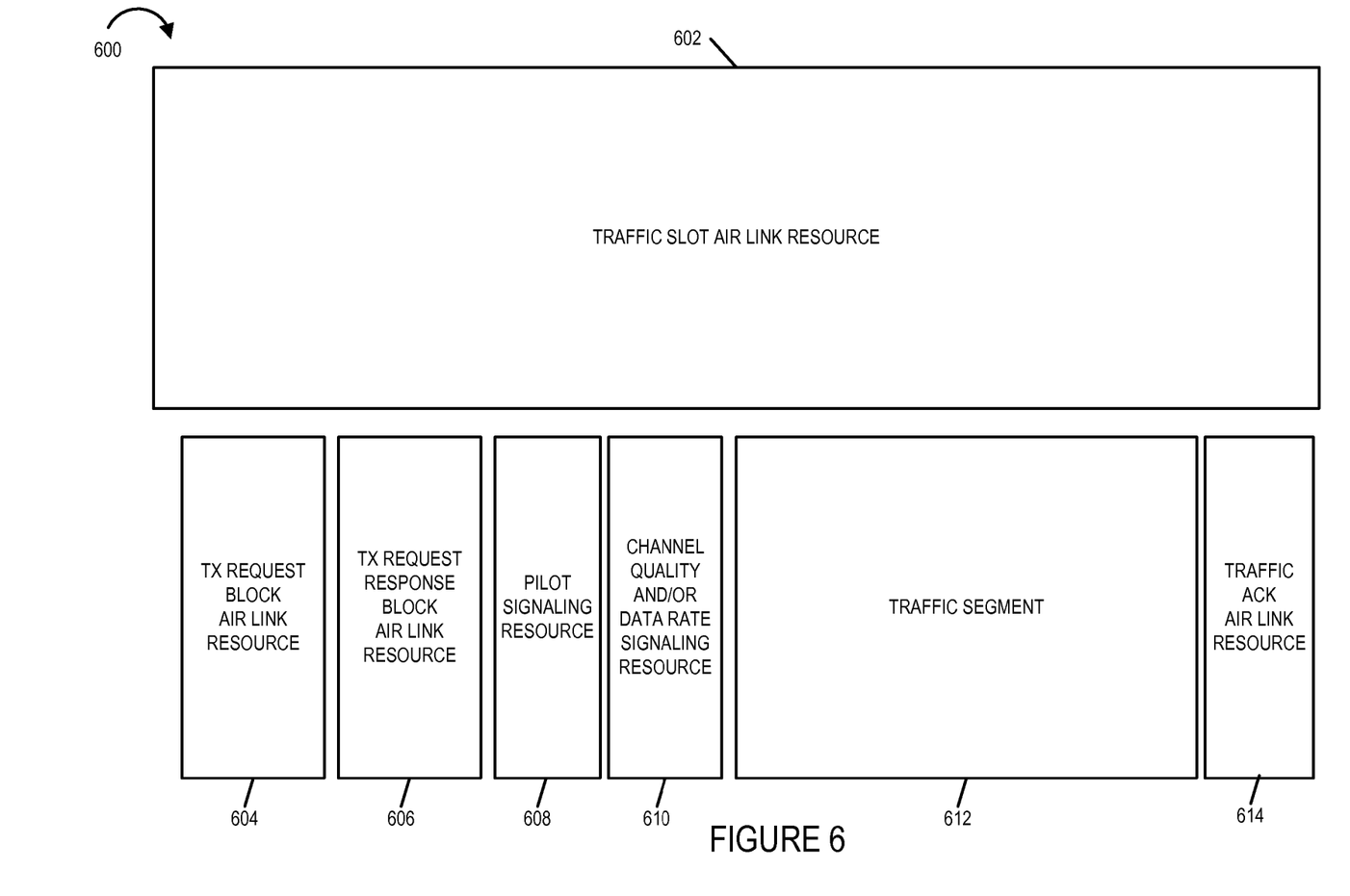
FIG. 6 is a drawing illustrating an exemplary traffic slot air link resource 602 in accordance with an exemplary embodiment.

FIG. 6 is a drawing 600 illustrating an exemplary traffic slot air link resource 602 in accordance with an exemplary embodiment. Traffic slot air link resource 602 of FIG. 6 is, e.g., one of the traffic slot air link resources (512, 514, 516, 518, 522, 524, 526, 528) of FIG. 5. Traffic slot air link resource 602 includes a transmission request block air link resource 602 for conveying transmission requests to transmit traffic in traffic segment 612, and a transmission request response block air link resource 606 for conveying request response signals signifying that from the intended receiver's perspective it is ok to transmit traffic signals in traffic segment 612. TX request block air link resources 604 and TX request response block air link resources 606 may be considered user scheduling air link resources corresponding to traffic segment

612. Traffic slot air link resources 602 also includes a pilot signaling resource 608 used by intended transmitters of traffic signals in traffic segment 612 to transmit pilot signals used to evaluate channel conditions and channel quality and/or data rate signaling air link resources, used by intended receivers of traffic in traffic segment 612 to transmit signals, e.g., quality indicator signals or data rate signals used to specify, determine, or derive the data rate to be used in traffic segment 612. Pilot signals resource 608 and channel quality and/or data rate signaling resource 610 may be considered rate scheduling air link resources corresponding to traffic segment 612. Traffic slot air link resource 602 also includes a traffic segment 612 used to carry traffic signals, e.g., peer to peer traffic signals, and traffic acknowledgment air link resources 614 used to carry ack and/or nak signals regarding the traffic being communicated in traffic segment 612.

Figure 7:
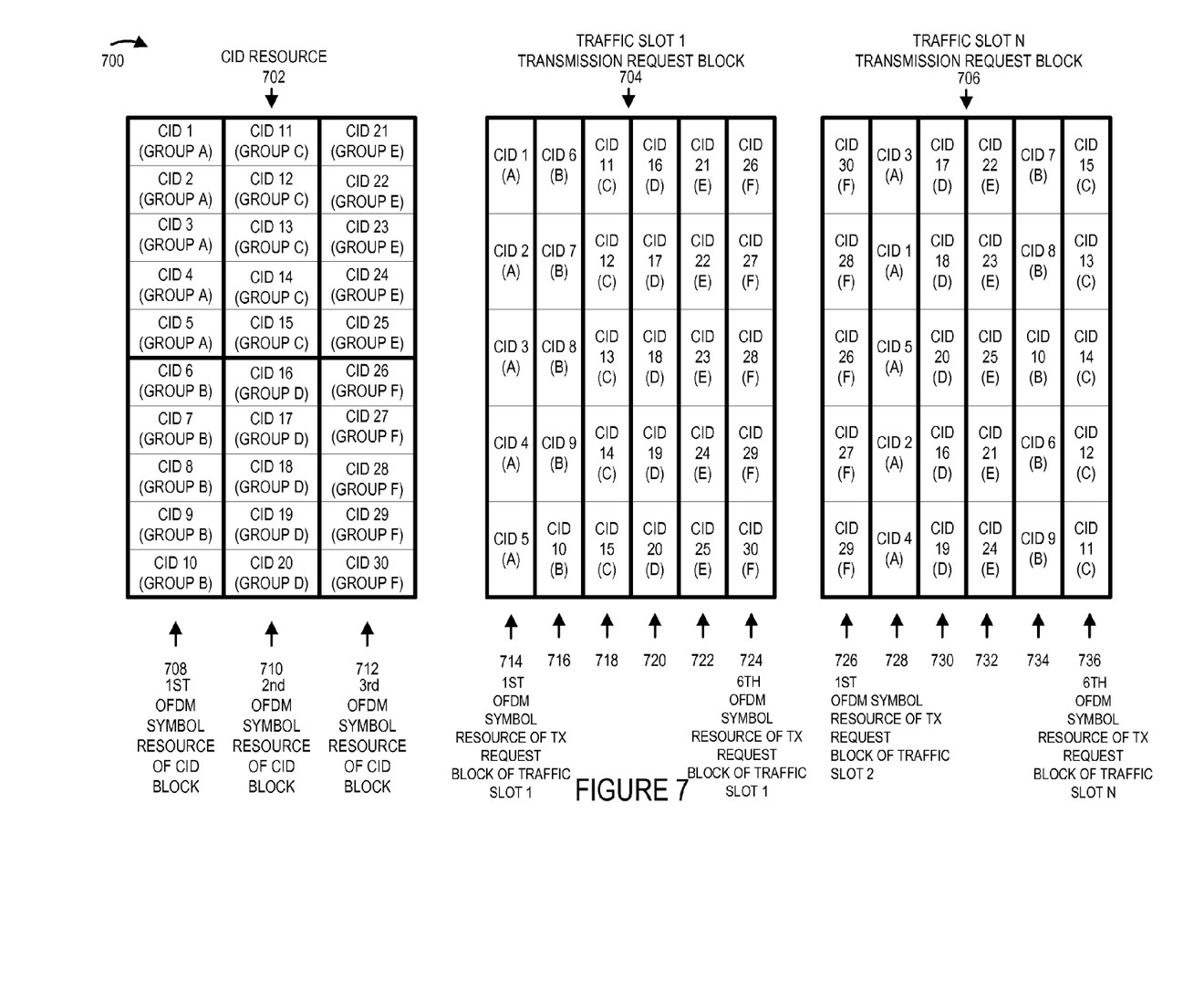
FIG. 7 is a drawing illustrating an exemplary connection identifier air link resource and two corresponding traffic slot transmission request block air link resources.

FIG. 7 is a drawing 700 illustrating an exemplary CID resource 702 and two corresponding traffic slot transmission request block air link resources (traffic slot 1 transmission request block 704, traffic slot N transmission request block 706). CID resource 702 is, e.g., CID broadcast air link resources 510 of FIG. 5. Traffic slot 1 transmission request block 704 is, e.g., the transmission request block included in traffic slot 1 air link resources 512 of FIG. 5, while traffic slot N transmission request block 706 is, e.g., the transmission request block included in traffic slot N air link resources 518 of FIG. 5.

CID resource 702 includes a set of connection identification transmission units, each transmission unit in said set of connection identification transmission units corresponding to a different connection identifier in a set of connection identifiers. In this example, there is a set of 30 connection identification transmission units corresponding to 30 different connection identifiers (CID 1, CID 2, . . . CID 30). A CID is associated with one of a plurality of groups, each group in the plurality of groups corresponds to a set of request response resources that are in the same transmission request symbol for a traffic slot.

In this example, there are six groups. Group A includes CIDs 1-5; group B includes CIDs 6-10; group C includes CIDs 11-15; group D includes CIDs 16-20; group E includes CID 21-25; group F includes CIDs 26-30). In this example, CID transmission units corresponding to group A and group B occur in the 1st OFDM symbol resource 708 of the CID resource block 702; CID transmission units corresponding to group C and group D occur in the 2nd OFDM symbol resource 710 of the CID resource block 702; and CID transmission units corresponding to group E and group F occur in the 3rd OFDM symbol resource 712 of the CID resource block 702. The actual location of a particular connection identifier transmission unit in the CID resource 702 is not important as long as the communications devices are aware of the mapping of the particular resource to a group. A communications device corresponding to a currently held connection broadcasts a signal in its CID transmission unit to notify other communications devices in its local vicinity that the connection identifier is taken and to facilitate selection of a connection identifier by another communications device seeking to acquire a connection identifier.

With regard to a transmission request block, members of the same group are intentionally placed in the same symbol transmission time interval. From one slot to another the relative position of the group may change within the transmission request block.

In this example, the first OFDM symbol resource 714 of transmission slot 1 transmission request block 704 is allocated to group A; the second OFDM symbol resource 716 of transmission slot 1 transmission request block 704 is allocated to group B; the third OFDM symbol resource 718 of transmission slot 1 transmission request block 704 is allocated to group C; the fourth OFDM symbol resource 720 of transmission slot 1 transmission request block 704 is allocated to group D; the fifth OFDM symbol resource 722 of transmission slot 1 transmission request block 704 is allocated to group E; and the sixth OFDM symbol resource 724 of transmission slot 1 transmission request block 704 is allocated to group F.

In this example, the first OFDM symbol resource 726 of transmission slot N transmission request block 706 is allocated to group F; the second OFDM symbol resource 728 of transmission slot N transmission request block 706 is allocated to group A; the third OFDM symbol resource 730 of transmission slot N transmission request block 706 is allocated to group D; the fourth OFDM symbol resource 732 of transmission slot N transmission request block 706 is allocated to group E; the fifth OFDM symbol resource 734 of transmission slot N transmission request block 706 is allocated to group B; and the sixth OFDM symbol resource 736 of transmission slot N transmission request block 706 is allocated to group C.

In this example, it may be observed corresponding to a particular group the vertical order, e.g., tones associated with particular CIDs in the group can change from one slot to another, e.g., in accordance with a tone hopping sequence which is known to the communications devices in the network.

Figure 8:
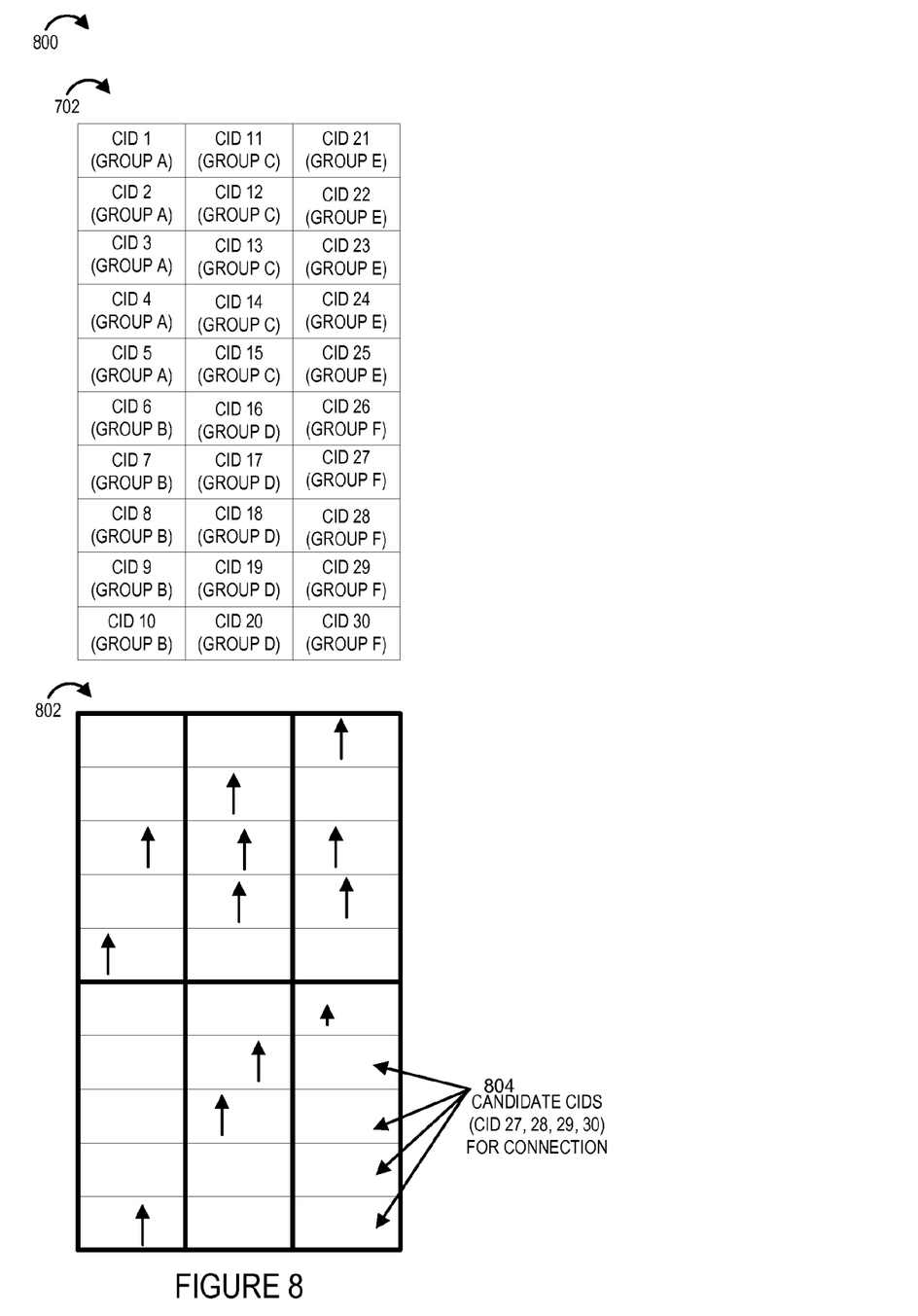
FIG. 8 is a drawing illustrating exemplary connection identification broadcast signals detected and measured by a communications device seeking to obtain a connection identifier.

FIG. 8 is a drawing 800 illustrating exemplary connection ID broadcast signals detected and measured by a communications device seeking to obtain a connection identifier. Drawing 800 includes exemplary connection ID resource 702 of FIG. 7 and block 802 illustrating exemplary detected connection ID broadcast signals corresponding to connection ID resource 702. It may be observed that the communications device detects broadcast connection ID signals corresponding to CIDs 3, 5, 10, 13, 14, 15, 17, 18, 21, 23, 24, and 26. This implies that CIDs 1, 2, 4, 6, 7, 8, 9, 11, 15, 16, 19, 20, 22, 25, 27, 28, 29 and 30 are currently locally available.

The communications device, in this embodiment, uses the number of detected used connection identifier signals in a group and measured power information corresponding to the detected connection identifier signals, to identify candidate CIDs. In this example, two CIDs were detected in group A, one CID in group B, three CIDs in group C, two CIDs in group D, three CIDs in group E and one CID in group F. Based on the number of detected CID signals for a group, e.g., above a predetermined minimum threshold, the communications device determines to limit its selection a locally available CID of either group B or group F, each which have one detected CID signal. The measured detected power level of the signal corresponding to CID 26 of group F is lower than the measured detected power level of the signals corresponding to CID 10 of group B. Therefore, the communications device decides that the locally available connection identifiers of group F (CID 27, CID 28, CID 29, and CID 30) are to be designated candidate CIDs as indicated by arrows 804.

The communications device further selects one of the CIDs from the set of {CID 27, CID 28, CID 29, CID 30} to use for its new connection. In some embodiments, the selection involves a pseudo-random selection. In some embodiments, the selection involves signaling and/or negotiation with a second communications device, the first and second communications devices being endpoints for the connection. The acquired connection is utilized by the first and second communications device in subsequent traffic slot, e.g., identifying in each slot which traffic transmission request unit to use to convey a transmission request and which traffic transmission request response unit to use for transmitting a request response signal.

Figure 9:
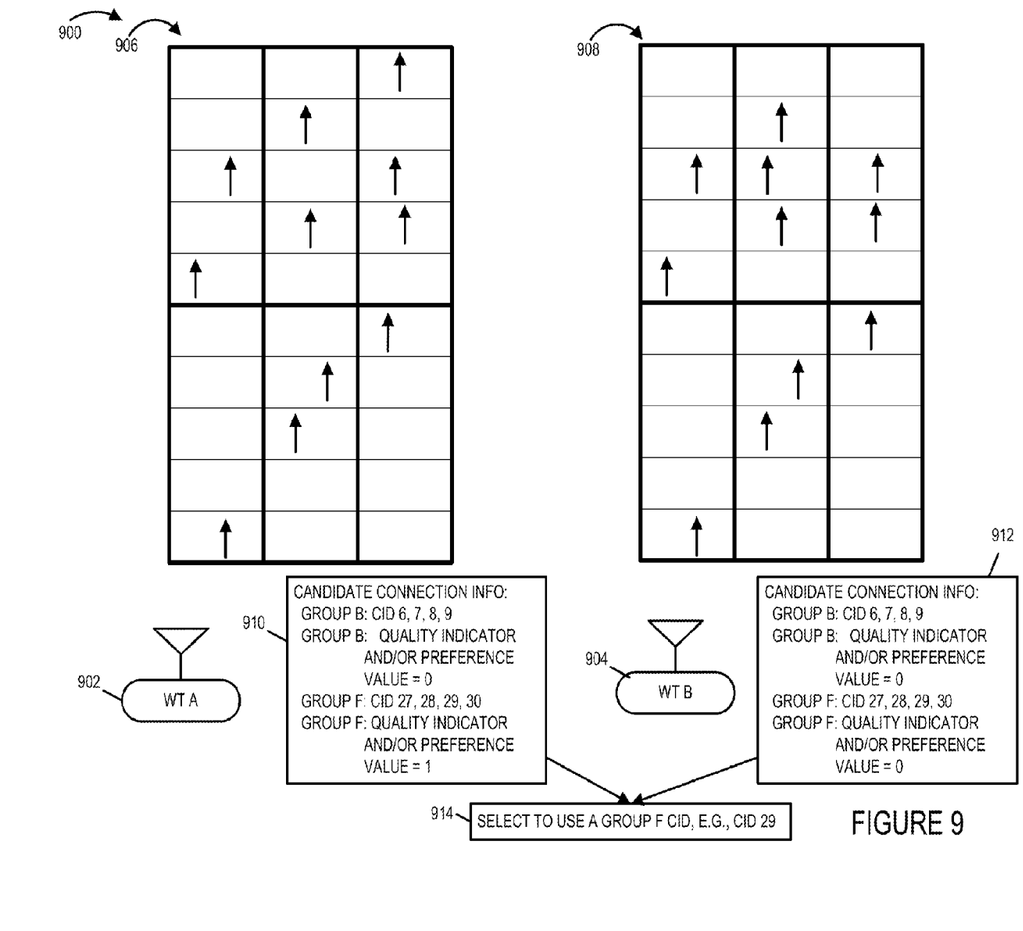
FIG. 9 includes drawing which illustrates an example of a connection acquisition in which two wireless terminals participate in making the selection of the connection identifier.

FIG. 9 includes drawing 900 which illustrates an example of a connection acquisition in which two wireless terminals (WT A 902, WT B 904 participate in making the selection of the connection identifier. WT A 902 and WT B 904 are located at different locations and thus detect different broadcast connection ID signals and/or measure different received power levels of detected broadcast CID signals. Block 906 identifies broadcast CID signals detected in CID block 702 by WT A 902, while block 908 identifies broadcast CID signals detected in CID block 702 by WT B 904.

In this example, WT A 902 detects CID signals corresponding to CIDs 3, 5, 10, 12, 14, 17, 18, 21, 23, 24, and 26. Therefore WT A 902 considers that CIDs 1, 2, 4, 6, 7, 8, 9, 11, 13, 15, 16, 19, 20, 22, 25, 27, 28, 29 and 30 are locally available. WT A 902 also recognizes that two CIDs are being used in group A, 1 CID is being used in group B, two CIDs are being used in group C, two CIDs are being used in group D, three CIDs are being used in group E, and one CID is being used in group F. Based on the number of received CID signals per group, group B or group F are the best choices. WT A 902 also measures the power level of the detected CID signals and generates a quality indicator and/or preference signal value corresponding to one or more groups. In this example, WT A 902 generates candidate connection information which indicates i) for group B CIDs 6, 7, 8, 9 are locally available and the quality indicator and/or preference value=0; ii) for group F CIDs 27, 28, 29, and 30 are locally available and the quality indicator and/or preference value=1, where a higher quality indicator and/or preference value is a better choice given other conditions being the same. Note that the detected signal for CID 26 was weaker than the detected CID signal for CID 10.

In this example, WT B 904 detects CID signals corresponding to CIDs 3, 5, 10, 12, 13, 14, 17, 18, 23, 24, and 26. Therefore WT B 904 considers that CIDs 1, 2, 4, 6, 7, 8, 9, 11, 15, 16, 19, 20, 21, 22, 25, 27, 28, 29 and 30 are locally available. WT B 904 also recognizes that two CIDs are being used in group A, one CID is being used in group B, three CIDs are being used in group C, two CIDs are being used in group D, two CIDs are being used in group E, and one CID is being used in group F. Based on the number of received CID signals per group, group B or group F are the best choices. WT B 904 also measures the power level of the detected CID signals and generates a quality indicator and/or preference signal value corresponding to one or more groups. In this example, WT B 904 generates candidate connection information which indicates i) for group B CIDs 6, 7, 8, 9 are locally available and the quality indicator and/or preference value=0; ii) for group F CIDs 27, 28, 29, and 30 are locally available and the quality indicator and/or preference value=0. Note that the detected signal for CID 26 was substantially the same as the detected CID signal for CID 10.

At least some candidate connection information is exchanged between WT A 902 and WT B 904, and a connection identifier is selected. For example, in one embodiment, WT A 902 communicates candidate connection information 910 to WT B 904. Then WB compares its set of candidate connection information 912 to received set 910, and recognizes that a candidate from group B, which appears on both lists, would be a best choice. Then WT B 904 selects one of CIDs 27, 28, 29 and 30. For example, WT B pseudo-randomly selects CID 29. Other final selection approaches are possible, e.g., selecting the lowest available CID in the preferred group which appears on both candidate lists. WT B 904 communicates its selection to WT A 902. WT A and WT B 904 subsequently utilize the newly acquired connection identifier in subsequent traffic slots, e.g., identifying which traffic transmission request unit to use.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, identifying locally available connection identifiers from a set of connection identifiers based on power received on individual connection identification transmission units in a set of connection identification transmission units; determining, for each group having an identified locally available connection identifier, an interference estimate; selecting a connection identifier from the identified locally available connection identifiers belonging to a group having an acceptable determined interference estimate, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node.

The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device, said method comprising:
    identifying locally available connection identifiers corresponding to at least a portion of a set of connection identification transmission units based on power received on at least the portion of the set of connection identification transmission units, wherein the locally available connection identifiers are mapped to request transmission units;
    determining interference estimates for each of one or more groups of the request transmission units, wherein each of the one or more groups of the request transmission units correspond to a different symbol transmission time interval;
    selecting a connection identifier from the identified locally available connection identifiers, wherein the connection identifier corresponds to a request transmission unit in one of the one or more groups of request transmission units belonging to a group having an acceptable determined interference estimate; and
    communicating based on the selected connection identifier.

2. The method of claim 1, wherein the acceptable a determined interference estimate is below an interference threshold level.

3. The method of claim 1, wherein the acceptable determined interference estimate is a lowest determined interference estimate.

4. The method of claim 1, further comprising:
    measuring the power received on at least the portion of the set of connection identification transmission units.

5. The method of claim 4,
    wherein said selected connection identifier is a candidate connection identifier, the method further comprising:
    transmitting the selected connection identifier to a second communications device having a communications connection with said first communications device.

6. The method of claim 5, wherein the selected connection identifier is transmitted as part of a set of selected candidate connection identifiers.

7. The method of claim 4, further comprising:
    receiving one or more candidate connection identifiers from a second communications device having a communications connection with said first communications device; and
    wherein the selecting the connection identifier from the identified locally available connection identifiers includes selecting the connection identifier which is one of the received one or more candidate connection identifiers.

8. A first communications device comprising:
    at least one processor configured to:
        identify locally available connection identifiers corresponding to at least a portion of a set of connection identification transmission units based on power received on at least the portion of the set of connection identification transmission units, wherein the locally available connection identifiers are mapped to request transmission units;
        determine interference estimates for each of one or more groups of the request transmission units, wherein each of the one or more groups of the request transmission units correspond to a different symbol transmission time interval;
        select a connection identifier from the identified locally available connection identifiers corresponding to a request transmission unit in one of the one or more groups of request transmission units having an acceptable determined interference estimate; and
        communicate based on the selected connection identifier; and
    a memory coupled to said at least one processor.

9. The first communications device of claim 8, wherein the acceptable a determined interference estimate is below an interference threshold level.

10. The first communications device of claim 8, wherein the acceptable determined interference estimate is a lowest determined interference estimate.

11. The first communications device of claim 8, wherein said at least one processor is further configured to:
    measure the power received on at least the portion of the set of connection identification transmission units.

12. The first communications device of claim 11,
wherein said selected connection identifier is a candidate connection identifier; and
wherein said at least one processor is further configured to:
transmit the selected connection identifier to a second communications device having a communications connection with said first communications device.

13. The first communications device of claim 12, wherein the selected connection identifier is transmitted as part of a set of selected candidate connection identifiers.

14. The first communications device of claim 11, wherein said at least one processor is further configured to:
receive one or more candidate connection identifiers from a second communications device having a communications connection with said first communications device, wherein the at least one processor
selects the connection identifier from the identified locally available connection identifiers as one of the received one or more candidate connection identifiers.

15. A first communications device comprising:
means for identifying locally available connection identifiers corresponding to at least a portion of a set of connection identification transmission units based on power received on at least the portion of the set of connection identification transmission units, wherein the locally available connection identifiers are mapped to request transmission units;
means for determining interference estimates for each of one or more groups of the request transmission units, wherein each of the one or more groups of the request transmission units correspond to a different symbol transmission time interval;
means for selecting a connection identifier from the identified locally available connection identifiers corresponding to a request transmission unit in one of the one or more groups of request transmission units having an acceptable determined interference estimate; and
means for communicating based on the selected connection identifier.

16. The first communications device of claim 15, wherein the acceptable determined interference estimate is below an interference threshold level.

17. The first communications device of claim 15, wherein the acceptable determined interference estimate is a lowest determined interference estimate.

18. The first communications device of claim 15, further comprising:
means for measuring the power received on at least the portion of the set of connection identification transmission units.

19. The first communications device of claim 18,
wherein said selected connection identifier is a candidate connection identifier, the first communications device further comprising:
means for transmitting the selected connection identifier to a second communications device having a communications connection with said first communications device.

20. The first communications device of claim 19, wherein the selected connection identifier is transmitted as part of a set of selected candidate connection identifiers.

21. The first communications device of claim 18, further comprising:
means for receiving one or more candidate connection identifiers from a second communications device having a communications connection with said first communications device; and
wherein said means for selecting the connection identifier from the identified locally available connection identifiers includes means for selecting a connection identifier which is one of the received one or more candidate connection identifiers.

22. A computer program product comprising: a non-transitory computer readable medium which stores code which when executed by a processor performs the following:
identifies locally available connection identifiers corresponding to at least a portion of a set of connection identification transmission units based on power received on at least the portion of the set of connection identification transmission units, wherein the locally available connection identifiers are mapped to request transmission units;
determines interference estimates for each of one or more groups of the request transmission units, wherein each of the one or more groups of the request transmission units correspond to a different symbol transmission time interval;
selects a connection identifier from the identified locally available connection identifiers corresponding to a request transmission unit in one of the one or more groups of request transmission units having an acceptable determined interference estimate; and
communicates based on the selected connection identifier.

23. The computer program product of claim 22, wherein the acceptable determined interference estimate is below an interference threshold level.

24. The computer program product of claim 22, wherein the acceptable determined interference estimate is a lowest determined interference estimate.

25. The computer program product of claim 22, wherein said computer readable medium further comprises code which when executed by the processor performs the following:
measures the power received on at least the portion of the set of connection identification transmission units.

26. The computer program product of claim 25,
wherein said selected connection identifier is a candidate connection identifier, and
wherein said computer readable medium further comprises code which when executed by the processor performs the following:
transmits the selected connection identifier to a second communications device having a communications connection with said first communications device.

27. The computer program product of claim 26, wherein the selected connection identifier is transmitted as part of a set of selected candidate connection identifiers.

28. The computer program product of claim 27, wherein said computer readable medium further comprises code which when executed by the processor performs the following:
receives one or more candidate connection identifiers from a second communications device having a communications connection with said first communications device; and
selects the connection identifier when selecting a connection identifier from the identified locally available connection identifiers as one of the received one or more candidate connection identifiers.

* * * * *